March 29, 1927.

L. H. FISHER 1,622,776

LENS TESTING INSTRUMENT

Filed Sept. 13, 1924 3 Sheets-Sheet 1

INVENTOR
LYLE H. FISHER.
BY
Harry H. Styll.
ATTORNEY

March 29, 1927.          L. H. FISHER          1,622,776
LENS TESTING INSTRUMENT
Filed Sept. 13, 1924        3 Sheets-Sheet 2
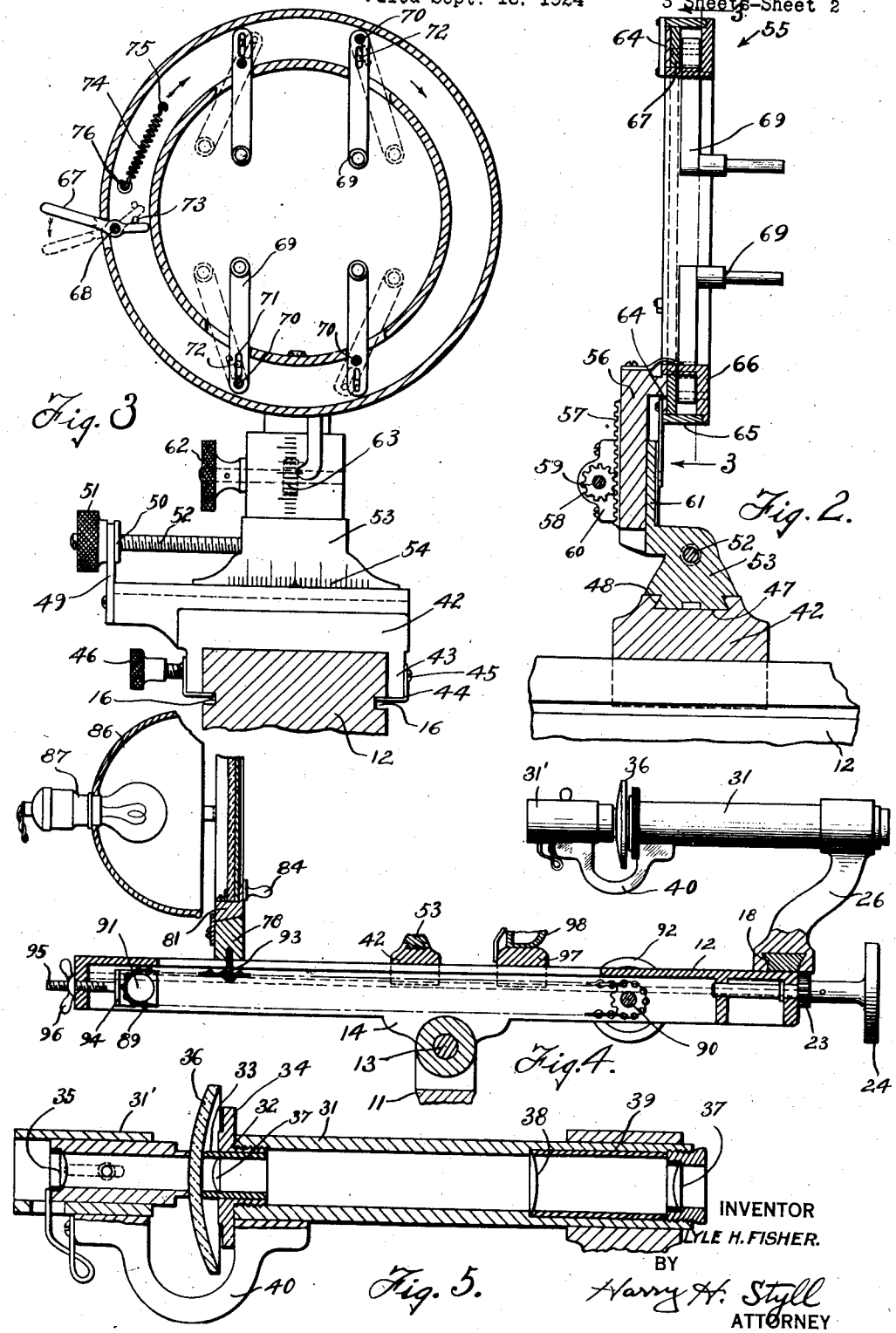
INVENTOR
LYLE H. FISHER.
BY
Harry H. Styll
ATTORNEY

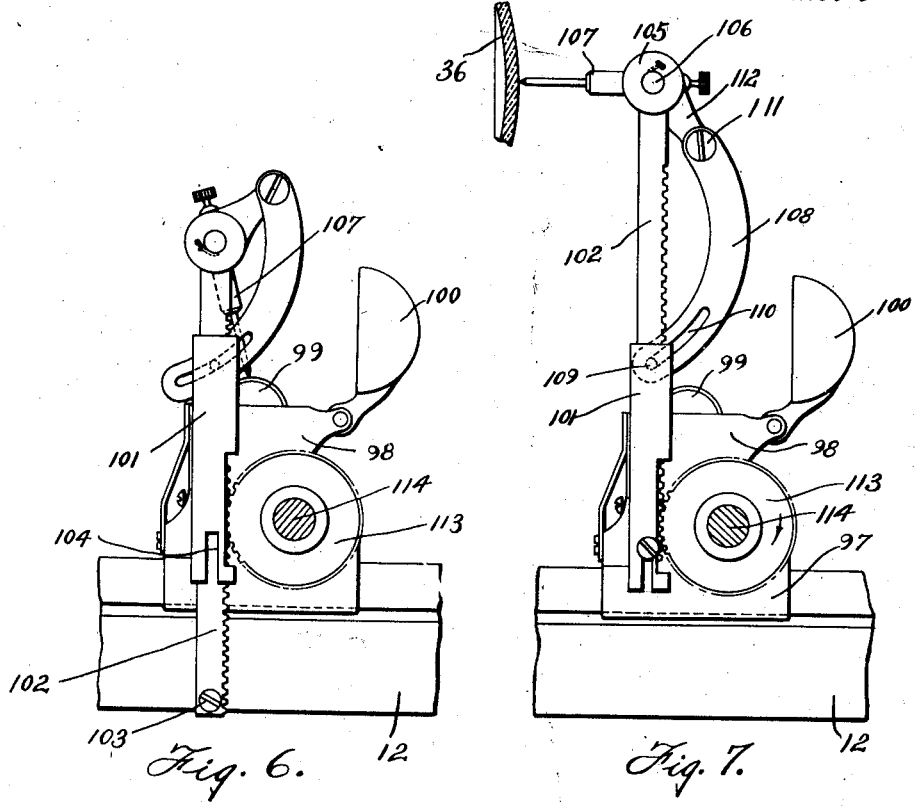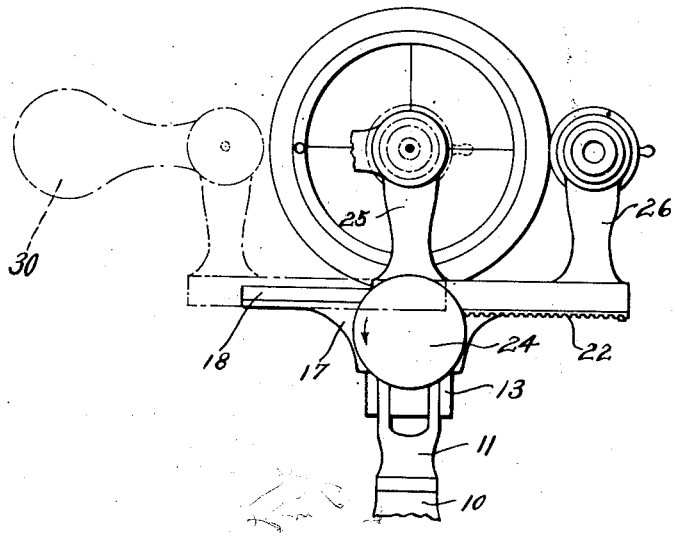

Patented Mar. 29, 1927.

1,622,776

UNITED STATES PATENT OFFICE.

LYLE H. FISHER, OF KANSAS CITY, MISSOURI, ASSIGNOR TO AMERICAN OPTICAL COMPANY, OF SOUTHBRIDGE, MASSACHUSETTS, A VOLUNTARY ASSOCIATION OF MASSACHUSETTS.

LENS-TESTING INSTRUMENT.

Application filed September 13, 1924. Serial No. 737,565.

The present invention relates to improvements in lens examining and testing instruments, and has particular reference to an improved construction of instrument adapted for use in determining and marking the center and axis of spherical or cylinder lenses and for testing the vertex focal value or values of ophthalmic lenses.

It frequently happens that in drilling, mounting or adjusting the lenses of spectacles and eyeglasses their correct relative positions will be altered to such an extent as to throw their optical axes from their normal prescribed positions thereby causing excessive strain of the eyes and other resultant physical discomforts even though the lenses themselves may be in exact accordance with the prescription. This condition is more often the direct result of incorrect drilling of the screw holes for the mounting, and in order that the lenses may be properly fitted to the eyes the screw holes in both must be disposed in a straight horizontal line to conform to the oculists' tests and prescriptions. If the lenses themselves are in accordance with what has been prescribed and the drill holes are improperly positioned it then becomes necessary to readjust the lenses in the mounting, or to readjust the mounting until the optical axes are so positioned as to relieve the eyes or produce the desired vision.

An important object of this invention is the provision of an instrument of this character in which an improved construction of marking mechanism shall be employed which may be readily moved into or out of the line of vision, and which shall be positively held in correct relation to the other parts of the instrument during the marking operation to insure correct marking of a lens.

A still further object of the invention is to render the marker more effective by protecting the ink pad against accumulation of dust and other foreign matter therein, and also by preventing undue evaporation of the ink.

A still further object of the invention is to provide an instrument for enabling the axis of the lenses to be readily determined with extreme accuracy, particularly in lenses of slight curvature, and also to provide a device by the use of which the lenses may be quickly and conveniently manipulated for centering and while the lens occupies its central position it may be suitably marked.

Other objects and advantages of the invention will become apparent during the course of the following description.

In the drawings, wherein like numerals are employed to designate like parts throughout the same:

Figure 2 is a vertical section through one of the lens clamps.

Figure 3 is a section taken on line 3—3 of Figure 2, looking in the direction of the arrow.

Figure 4 is a fragmentary longitudinal section through the instrument.

Figure 5 is a longitudinal section through the lens system used in my instrument.

Figure 6 is a side elevation of the marking mechanism in an operative position.

Figure 7 is a side elevation of the marking mechanism in an operative position.

Figure 8 is a front elevation of the instrument.

Figure 1:
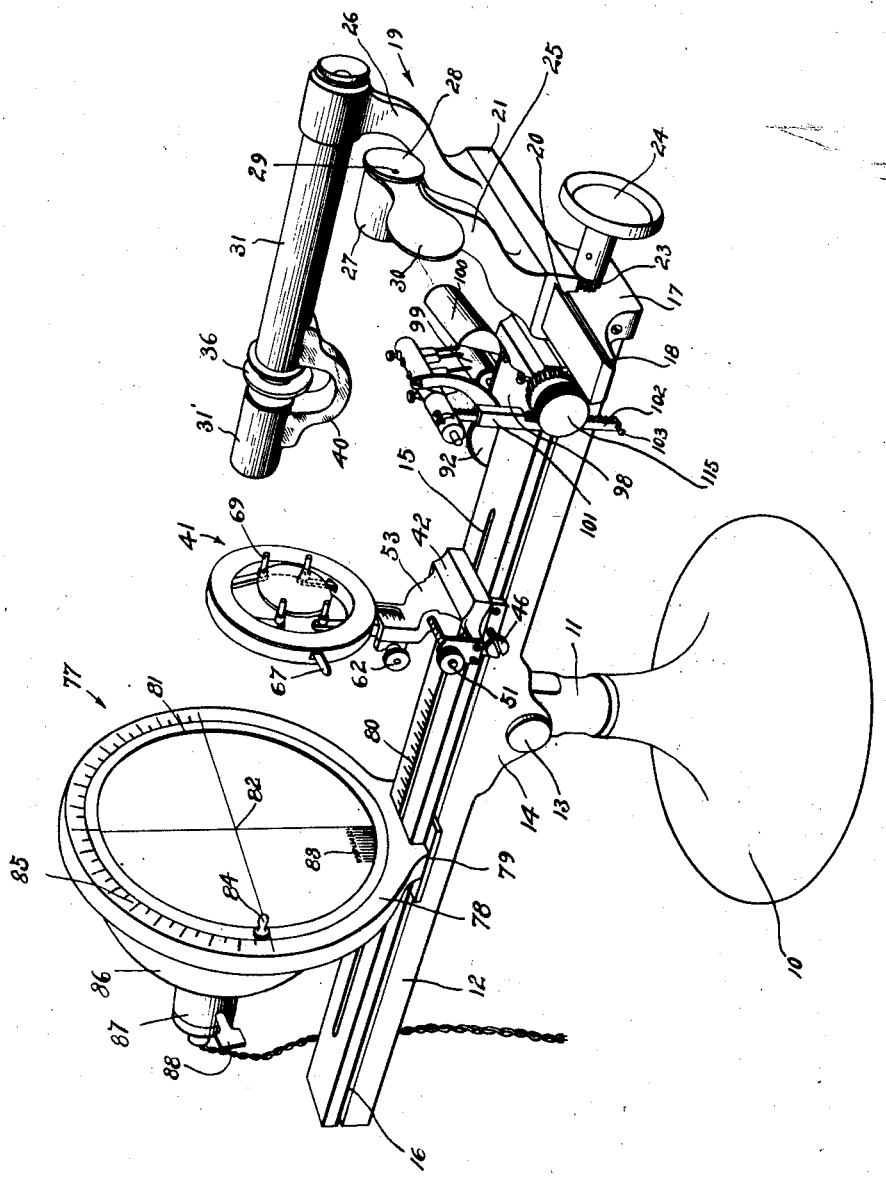
Figure 1 is a perspective view of the instrument in its entirety.

In the drawings, wherein for the purposes of illustration is shown the preferred embodiment of the invention, the numeral 10 designates a base or standard, upon which the instrument is mounted, and supports a trunnion 11. A carriage 12 is pivotally mounted upon the trunnion 11 by means of the pin 13 which passes through the depending ears 14 formed integral with the carriage 12 by which means the carriage 12 may be raised or lowered by reason of the pivot pin 13, or it may be rotated by reason of the trunnion 11. The carriage 12 is provided with the channel 15, the purposes of which will be more fully described hereinafter.

Formed along the sides of the carriage 12 near the upper surface thereof is a groove 16 which is of a substantial depth so as to allow for the insertion of various parts, thus forming a guide and slide way.

A block 17 having the upper dove-tail slide 18 is mounted at the front end of the carriage 12 in such a manner that the slide 18 will be transverse to the main carriage 12. Adapted to slide on the member 18 is a movable sighting portion 19 in its entirety. The member 19 is provided with the dovetail groove 20 which is adapted to receive the member 18, the depending lip 21 thereof being provided with a rack portion 22 which meshes with a pinion 23 which is rotated by means of the wheel 24 which is keyed to the pinion 23. By means of the handle 24, pinion 23 and rack 22, the sight member 19 may be shifted transversely of the carriage 12. The sighting member is provided with two upstanding arms 25 and 26, respectively, arranged in preferably spaced parallel relation, one being located at one end of the member and the other at the opposite end. The arm 25 is provided with the sleeve portion 27, within the front end of which is provided a cup member 28 having a minute aperture 29 which is used as a peep hole in the present instance. A movable blinder 30 which may be swung to the right or left is pivotally mounted on the cup 28.

The arm 26 supports the cylindrical member 31 which contains a lens system such as is clearly shown in figure 5 of the drawing. Secured at the forward end of the cylinder 31 is a plug 32 bearing the projecting tube or lens support 33 and the intermediate flange portion 34. This flange portion bears the center line of graduations for use in horizontally lining up a lens resting against the tube. The plug 32 is secured in adjusted position in the cylinder 31, permitting of adjustment of the plug to bring the upper or lens engaging end of the tube 33 the exact proper distance from the lens 35 at the opposite end of the cylinder 31' so that the lens 36 being tested will be properly measured as of effective power at the back or tube engaging face of the lens. The casing further bears at its lower end adjacent the lens to be tested, a lens member 37, while at its upper end is the telescope or image viewing portion, including the lenses 37 and 38 so disposed and of such power as to image only parallel rays of light, the image from the target portion of the instrument being projected through the lens 35, the lens 36 being tested, and the lens 37 to form a suitable aerial image, and the telescope 39 being disposed to receive and enlarge this aerial image when the instrument is in proper adjustment. It will, of course, be seen that the sleeves 31 and 31' are mounted in spaced relation by means of the U-shaped bracket 40, which bracket will be deep enough to allow for the placing of the lens 36 to be tested.

As is clearly shown in Figure 1 of the drawings, a lens holder designated in its entirety by the numeral 41, is slidably mounted on the carriage 12, and is used when the arm 25 is thrown into alignment with said carriage 12. The lens holder 41 comprises a base 42 having the depending lips 43 upon which are detachably connected the angle members 44 held in place by the screws 45. The angle member 44 is so arranged as to ride within the channel 16 formed in the carriage 12, and a set screw 46 is passed through one of the lips 43 to bear against the carriage 12 to maintain the lens holder in the desired adjustment. The base 14 is provided with the dovetail slot 47 in which is received the dovetail rib 48, by which means the upper portion of the lens holder may be moved transversely of the carriage 12. One end of the base 44 is provided with the upstanding plate 49 having a cut out portion 50 adapted to receive an adjusting screw 51. The adjusting screw 51 is associated with the adjusting shaft 52 which is rigidly carried by the portion 53 of the lens measure. Upon rotation of the adjusting nut 51 the shaft 52 is moved to and from the same, thus moving the portion 53 on the base 42. Suitable graduations 54 are provided to determine the exact location of the lens holder portion 53 when in use.

The ring portion 55 comprises the vertically disposed arm 56, upon the back face of which is arranged a rack bar 57 which has engagement with a pinion 58 carried by the shaft 59, said shaft being journalled through the journals 60 carried by the upright portion 61 of the member 53. In this way the ring portion 55 may be raised and lowered by reason of the adjusting nut 62 which when operated will rotate the pinion 58 so as to raise and lower the arm 56. Suitable graduations 63 are provided to determine the exact amount or location of the ring.

A stationary ring 64 is carried by the arm 56 and supports the ring portions 65 and 66. A movable ring 67 is arranged adjacent the stationary ring 64 and is housed between the portions 65 and 66, respectively. The portion 65 is provided with a small slot so as to allow the insertion of the operating lever 67, which lever is pivoted on the pin 68, which is carried by the outer member 66. The lens engaging fingers 69 are pivoted at one end to pins 70, which pins are carried by the outer ring portion 66. As is seen, with the two adjacent lens engaging fingers the pin in one instance is arranged at the lower extremity, while in the other the pin is in the upper extremity. Elongated slots 71 are provided in the fingers 69 in which pins 72 are adapted to operate. The pins 72 are carried by the movable plate or ring portion 67, and it will thus be seen that when the operating lever 67 is pivoted around the pin 68 it will engage the pin 73 carried by the ring portion 67, whereupon said ring portion will be moved in the direction of the arrows, thus causing the pins 72 to ride within the slots 71, causing the lens engaging fingers to spread apart, as indicated in dotted lines in Figure 3 of the drawings. A spring 74 having engagement at one end with the pin 75 carried by the ring 67 and at the opposite end with the pin 76 carried by the portion 66, is provided to normally hold the lens engaging fingers in position, as indicated in full lines in Figure 3. When it is desired to mount a lens the operating lever 67 is depressed, whereupon the fingers will spread apart, thus allowing the insertion of the lens, and upon release of the lever 67 by reason of the spring 74 the fingers will be drawn inwardly of the ring portions, thus engaging the lens, and as the fingers move simultaneously the lens will be properly positioned for examination.

Arranged in the rear of the lens holder 41 is a slidable target 77 which comprises the outer annulus 78 carrying the slides 79 which are adapted to run within the slots 16 formed in the carriage 12. Graduations 80 are provided to show the exact location of the annulus 78 upon the carriage. Arranged within the annulus is a ring member 81 which supports a special milk white glass which is covered with an extra thin clear glass for protection. The glass is provided with the cross lines 82 and the graduations 83, as is clearly shown in Figure 1 of the drawings. A suitable operating handle or knob 84 is so provided that the ring 81 may be moved within the annulus 78, and to determine the exact location graduations 85 are arranged on the annulus 78. A reflector 86 is connected to the rear of the annulus and accommodates a lamp socket 87 and switch 88, by which means source of light is provided and is moved with the target 77.

To facilitate movement of the target a sprocket chain 89 is trained over the pinion 90 and the idler 91. The pinion 90 is operated by the wheel 92 arranged at one side of the carriage 12. A suitable screw is passed through one of the links of the sprocket chain and is seated on the lower face of the annulus 78, said screw 93 being removable when it is desired. In order to regulate the tension of the sprocket 89 the idler 91 is carried by a cage 94 which has connection with the threaded shaft 95 and a thumb nut 96 bearing against the end of the carriage 12. It will thus be seen that upon rotation of the handle 92 the pinion 90 will operate the sprocket chain 89, thus moving the target 77 to and from the lens holder 41.

As is clearly shown in Figure 1 of the drawings, suitable marking means is movably mounted on the carriage 12 arranged between the lens holder 41 and the sighting portion 19. The marking arrangement comprises a base 97 which is slidably mounted on the carriage 12 and supports a roller box 98 which supports the inking roller 99, said box having the pivoted cover 100 which is normally kept closed to keep out the dust and other foreign matter which tends to cause quick deterioration of the roller.

A square sleeve portion 101 is mounted in a vertical position at one end of the inking box 98 and is adapted to accommodate a rack bar 102 which has a pin 103 at one end which abuts within a slot 104 to restrict its movement, as is clearly shown in Figure 7 of the drawings. The rack 102 supports at its upper end a short sleeve section 105 through which is journalled a shaft 106 which has keyed thereto the marking points 107 which are of the usual spring construction so as to allow their accommodation to various shaped lenses when in use. An arcuate arm 108 is slidable on the pin 109 carried by the sleeve 101, said pin 109 being slidable in the arcuate elongated slot 110. The opposite end of the arcuate arm 108 is pivotally connected by means of the pin 111 to the stub arm 112 which is keyed to the shaft 106. Associated in proximity with the rack 102 is an enlarged pinion 113 which is carried by the shaft 114, said shaft carrying at its outer end the operating wheel 115.

In use a lens may be placed within the lens holder 41 by depressing the lever 67, which throws the fingers 69 outwardly allowing the insertion of a lens therebetween, and upon release of the lever 67 the spring 74 will cause the fingers 69 to engage the lens. By moving the wheel 24 the pinion 23 will engage the rack 22 thus moving the arm 25 into alignment with the holder 41 and the target 77. The user sights through the small aperture 29 and adjusts the target by means of the operating member 92 to and from the lens holder 41, and if necessary the lens holder 41 is moved so as to find the proper location. If it is desired the lens holder 41 may be moved transversely of the carriage 12 by reason of the adjusting means 50, 51 and 52, or if it is desired it may be raised or lowered by means of the operating wheel 62. By sighting through the aperture 29 the exact optical center of the lens may be located by reason of the target 77, and when it has been located the marking device is moved up to the holder 41, whereupon the cover 100 may be swung open, the points made to contact with the inking roll, and by operating the hand wheel 115 the marking points may be swung up into position to be placed into contact with the lens, thus properly marking the same in the manner as will be readily understood. If it is then desired to ascertain the powers of the lens it may be removed from the holder 41 and placed between the portions 31 and 31' which are carried by the arm 26. By operating the member 24 said tubes may be moved transversely of the carriage 12, whereupon the powers may be ascertained by use of the target 77.

It will thus be seen that I have devised an instrument wherein the center and axis of a lens may be readily determined and marked, after which the powers of the lenses may be quickly ascertained by simply shifting the head 19 transversely of the carriage 12 and removing the lens from the holder 41 to the position as shown in Figure 5. In this manner considerable space will be saved and a great deal of moving around will be done away with. By adding the head 19 having the upstanding arms 25 and 26, I have constructed a machine that will do the work of two machines that have ordinarily heretofore been employed.

It is to be understood that the form of my invention herewith shown and described is to be taken as the preferred embodiment of same, and that various changes may be made in the shape, size and arrangement of parts without departing from the spirit of the invention or the scope of the sub-joined claims.

Having thus described my invention, what I claim is:

1. In a device of the character described, a support, a centered target on the support, a member carrying a centering sight and a focusing sight and means for moving said member to align either the centering sight or the focusing sight with the target as described.

2. In a device of the character described, a support, a centered target on the support, a member carrying a centering sight and a focusing sight, a rack bar carried by the said member and a pinion operable therewith for moving said member to align either the centering sight or the focusing sight with the target as desired.

3. In a device of the character described, a support, a lens clamp on the support, a target on the support centered with the lens clamp, a cross member on the support having a sight opening and means to move the cross member to move the sight opening into or out of alignment with the target.

4. In a device of the character described, a support, a lens clamp on the support, a target on the support centered with the lens clamp, a cross member on the support having a sight opening, a rack bar carried by the said member and a pinion engageable therewith to move the sight opening into or out of alignment with the target.

5. In a device of the character described, a support, a target on the support, a cross member on the support having a lens system adapted to measure the power of a lens to be tested, means for holding the lens to be tested on the cross member and means for moving the lens system into or out of alignment with the target.

6. In a device of the character described, a support, a target on the support, a lens clamp on the support, a cross member on the support having a centering sight and a focusing sight, means to align either the centering sight or the focusing sight with the target and means for holding the lens to be tested on the cross member, 7. In a device of the character described, a support, a centered target on the support, a cross member arrayed at the opposite end of the support, a pair of spaced arms on the cross member, a sight opening associated with one of said arms and a focusing member carried by the other of said arms and means for shifting either of said sights into alignment with the target.

8. In a device of the character described, a support, a centered target on the support, a cross member arranged at the opposite end of the support, a pair of spaced arms on the cross member, a centering sight associated with one of the arms and a focusing sight associated with the other of said arms, a rack carried by the cross member, and a pinion operable with the rack to shift either of said sights into alignment with the target.

9. In a device of the character described, a support, a centered target on the support, a member carrying a centering sight and a focusing sight, said focusing sight including a separated sleeve, a lens system arranged within the separated sleeve, and a spring pressed tube operable within one section of the sleeve and adapted to contact with a lens to hold the same in position for examination.

10. In a device of the character described, a support, a cross slide on the support, a lens system carried by the cross slide, a spring clamp arranged within the lens system, a target on said support and means to align the lens system with the target.

11. In a device of the character described, a support having a slide, a lens holder slidable on the slide and an inking device slidable on the slide comprising a support having an ink pad, a cross bar having inking pins adapted to engage the pad, a rack bar, a guide for the rack bar, a bearing for the cross bar on the rack bar, a pivoted link joining the support and the cross bar, and a pinion for moving the rack bar whereby the pivoted link rotates the pins from a position where they engage the pad to a position in line with the lens holder while the pins are carried from the level of the pad to a level of the center of the lens holder.

12. In a device of the character described, a support having a slide, a lens holder slidable on the slide and an inking device on the slide comprising an ink pad, a bar having inking pins adapted to engage the pad, a slide bar, a guide for the slide bar, a bearing for the inking pin bar on the slide bar, a pivoted link engaging the inking pin bar whereby the pivoted link rotates the pins from a position where they engage the pad to a position in line with the lens holder while the pins are carried by the slide bar from a position level with the pad to the level of the center of the lens holder.

13. In a device of the character described, a support, a lens holder on the support comprising a plurality of pivoted levers and a movable member having contacts engaging the levers whereby the levers are separated when the movable member is moved in one direction and brought towards each other when the movable member is moved in the opposite direction, means for raising and lowering the lens holder, and means for moving the lens holder transversely of the support.

14. In a device of the character described, a support, a lens holder on the support comprising a plurality of pivoted levers and a movable member having contacts engaging the levers whereby the levers are separated when the movable member is moved in one direction and brought towards each other when the movable member is moved in the opposite direction, and means for raising and lowering the lens holder.

15. In a device of the character described, a support, a lens holder on the support comprising a plurality of pivoted levers and a movable member having contacts engaging the levers whereby the levers are separated when the movable member is moved in one direction and brought towards each other when the movable member is moved in the opposite direction, and means for moving the lens holder transversely of the support.

LYLE H. FISHER.